United States Patent [19] [11] 4,402,000

Fabel et al. [45] Aug. 30, 1983

[54] ELECTROGRAPHIC RECORDING METHOD AND APPARATUS WITH CONTROL OF TONER QUANTITY AT RECORDING REGION

[75] Inventors: George W. Fabel, Banks, Oreg.; Richard W. Lindahl, Hudson, Wis.

[73] Assignee: Minnesota Mining and Manufacturing Company, St. Paul, Minn.

[21] Appl. No.: 269,069

[22] Filed: Jun. 2, 1981

Related U.S. Application Data

[63] Continuation of Ser. No. 22,859, Mar. 22, 1979, abandoned.

[51] Int. Cl.³ .............................................. G01D 15/00

[52] U.S. Cl. .................................. 346/155; 346/153.1

[58] Field of Search ..................... 346/150, 153.1, 155, 346/160.1, 165

[56] References Cited

U.S. PATENT DOCUMENTS

| | | | |
|---|---|---|---|
| 3,396,401 | 8/1968 | Nonomura | 346/21 X |
| 3,540,409 | 11/1970 | Lloyd | 346/160.1 X |
| 3,683,406 | 8/1972 | Howell | 346/153.1 |
| 3,816,840 | 6/1974 | Kotz | 346/153.1 |
| 3,914,771 | 10/1975 | Lunde et al. | 346/155 X |
| 3,914,771 | 10/1975 | Lunde et al. | 346/155 |
| 3,946,402 | 3/1976 | Lunde | 346/153.1 |
| 3,946,402 | 3/1975 | Lunde | 346/155 |
| 3,983,801 | 10/1976 | Watanabe et al. | 346/160.1 X |
| 4,103,306 | 7/1978 | Clapp | 346/74.2 |
| 4,118,710 | 10/1978 | Tomita et al. | 346/153.1 |
| 4,124,287 | 11/1978 | Bean et al. | 346/153.1 |

*Primary Examiner*—Thomas H. Tarcza
*Attorney, Agent, or Firm*—Cruzan Alexander; Donald M. Sell; Robert L. Marben

[57] ABSTRACT

An electrographic method and apparatus are provided for maintaining a controlled quantity of electronically conductive toner in the recording region formed between an array of stylus electrodes and a receptor recording member. A regular or relatively uniform supply of toner is provided to said recording region where a temporally constant force is presented which acts on the toner to establish an electronically conductive path via the toner between the electrodes and the recording member. Recording electrical potential signals selectively applied to the first electrodes relative to the recording member cause toner to be deposited on the recording member as image toner. A toner removal means provides a temporally constant force for removing excess accumulated toner from said recording gap to a point where it is out of electronic contact with the toner at the recording gap. Non-image toner removal means positioned at a point remote from the recording region is also disclosed.

23 Claims, 8 Drawing Figures

ELECTROGRAPHIC RECORDING METHOD AND APPARATUS WITH CONTROL OF TONER QUANTITY AT RECORDING REGION

This is a continuation of application Ser. No. 22,859 filed Mar. 22, 1979, now abandoned.

BACKGROUND OF THE INVENTION

This invention relates to electrographic stylus recording and in particular to a method and apparatus for maintaining a controlled quantity of toner in the recording gap formed between an array of stylus electrodes and a receptor recording surface.

The broad field of electrographics may be regarded as involving creation of an image pattern through electrical means. Undoubtedly, the most widely used area of electrographics is that known as electrophotographics wherein the image pattern is created by directly subjecting a photosensitive recording member to a combination of electrical means and a light image. In electrostatic electrophotography, the image pattern exists as a pattern of electrostatic charges on the recording member.

Another broad area of electrographics, and the one to which this invention relates, does not necessarily rely upon the direct focusing of a light image on a photosensitive recording member, but rather forms the image pattern by electrical means alone.

Electrographic systems not utilizing direct light imaging find their major usage in oscillographic recording, computer printers, plotters, facsimile machines and the like. Some of the major systems in use can be characterized as spark recording (see U.S. Pat. Nos. 2,035,474 and 3,355,473), electrolytic recording (see U.S. Pat. No. 3,075,193), electrostatic stylus recording (see U.S. Pat. Nos. 2,932,690 and 2,932,548), and electrophoretic recording (see U.S. Pat. Nos. 3,121,375; 2,035,475 and 2,932,690).

In U.S. Pat. No. 3,816,840 to A. R. Kotz, an electrographic stylus recording process and apparatus is disclosed wherein electronically conductive toner at a recording region is presented between one electrode and the surface of a passive dielectric recording member which is in electronic contact with a second electrode. A portion of the toner is selectively deposited as image toner on the surface of the recording member in accordance with electrical potential signals applied across the two electrodes. U.S. Pat. No. 3,914,771 to Lunde uses the teachings of the Kotz patent, supra, and discloses a fixed cylindrical shell enclosing a rotatable roll containing a multiplicity of magnetic pole pieces with alternating north and south poles around the circumference of the roll. The magnet roll is rotated to cause an alternating magnetic force which varies in time, magnitude and polarity at the styli tips which are spaced from a dielectric recording member. Movement of the pole pieces cause magnetically attractable, electronically conductive toner presented to the shell to move around the shell through the gap presented between the styli tips and the recording member. Chains of toner particles regularly bridge the gap in response to the cyclic magnetic field produced by the rotating magnet roll to provide an electronically conductive path between the styli tips and dielectric recording member. Electronic pulses are applied to the styli and are synchronized with the rotation of each pole piece so as to be applied when a pole piece is positioned so that toner chains bridge the recording gap causing toner to be deposited on the recording member. The maximum practical printing speed for a given quality of printing (i.e., recorded dots/cm) of this rotating magnet machine is limited by the number of magnet pole pieces and the speed of rotation of the magnet roll. It is also recognized that since a good electronically conductive path is not maintained via the toner during a portion of the time that a magnetic pole piece of the magnet roll rotates past the styli tips, a truly continuous uniform line of toner in the direction of dielectric recording member motion cannot be deposited by a stylus using the teachings of the patent to Lunde.

U.S. Pat. No. 3,946,402 to Lunde recognizes the need for controlling the delivery of toner to a recording gap provided between a styli array and a dielectric recording member, but retains the same structure for the stylus array used with the stationary shell and rotatable roll of a plurality of magnetic pole pieces as disclosed in his U.S. Pat. No. 3,914,771, supra, and, therefore, requires synchronization of the applied electronic pulses with the position of the pole pieces. While control of delivery of the toner to the recording gap is obtained, a problem remains with respect to excess toner accumulation at the recording gap due to variations in the amount of recorded image that is formed. A varying supply of toner at the recording gap causes variation in size and placement of toner on the recording member at the stylus in response to a recording signal.

SUMMARY OF THE INVENTION

The present invention overcomes the excess toner accumulation problem at the recording gap that is present in the prior art arrangements. In addition, the present invention does not use rotating magnets at the recording gap eliminating the need for synchronizing the application of electronic pulses to the various electrode styli in a stylus array with the optimum formation of chains of electronically conductive toner at a recording region formed between the styli array and a receptor recording member and avoids the speed limitation that is imposed in prior art apparatus by the number of magnet pole pieces and their speed of rotation. It has been found that the present invention provides for deposition of toner in a truly continuous uniform line in the direction of movement of the recording member in response to continuous application of an electrical potential to a stylus.

The process and apparatus of the present invention is used with electronically conductive toner and includes first and second electrodes in spaced opposing relationship with a receptor recording member spaced from the first electrode for providing a recording region between the first electrode and the receptor recording member. The receptor recording member is adapted for making electronic contact with the second electrode and the first electrode and receptor recording member are adapted for movement relative to one another. A toner supply means is provided for supplying the toner to the recording region in a regular or relatively uniform rate for deposition on said receptor recording member as image toner. A force producing means provides a temporally relatively constant force acting on the toner supplied to said recording region to establish an electronically conductive path via the toner between the first electrode and the receptor recording member and also provides a temporally relatively constant force for removing a portion of the toner from the recording gap and from electronic contact with the toner at the recording gap. The apparatus also includes circuitry adapted to apply recording electrical potential signals to said first electrode relative to said second electrode to cause a portion of the toner present at the recording region to be deposited as image toner or the receptor recording member. The toner removal force serves to maintain a relatively constant quantity of toner in the recording region thereby providing consistency with respect to the electronic paths provided by the toner bridging between the first electrode and the receptor recording member.

Some toner may remain in non-image (background areas) of the toner image on the recording member. A second toner removal force may be utilized downstream of the first electrode to remove the relatively small quantity of toner present in the background areas of the image in some embodiments. Using a second toner removal force is not essential, but its use provides greater latitude in the physical properties and positioning of components used to produce the toner image.

This invention is useable to provide a very high speed, high quality recording process and apparatus as a computer output printer either directly onto paper or, in conjunction with a camera and reduction optics, as a microfilm recorder. Its high speed, high resolution capability also makes the apparatus and process useable in the field of phototypesetting or in the direct transfer of electronic information to printing plates.

In addition, the invention is useable to provide a styli printer which can easily be run at variable speeds. This feature allows it to be used as the output printer for certain variable speed facsimile devices.

This invention is useable to provide a printing device capable of printing up to 16 or more distinct or continuous gray scale levels with variable gray scale response (gamma) and provides a degree of resolution plus rate of operation permitting its use as the printer for an electronic copier wherein recording electrical potential signals are supplied from an optical to electrical transducer which scans an original document to be copied.

This invention also provides for a simplified stylus array construction.

DESCRIPTION OF THE DRAWINGS

For a fuller understanding of the nature and objects of the invention, reference should be had to the following detailed description taken in connection with the accompanying drawings in which.

DETAILED DESCRIPTION

Figure 1:
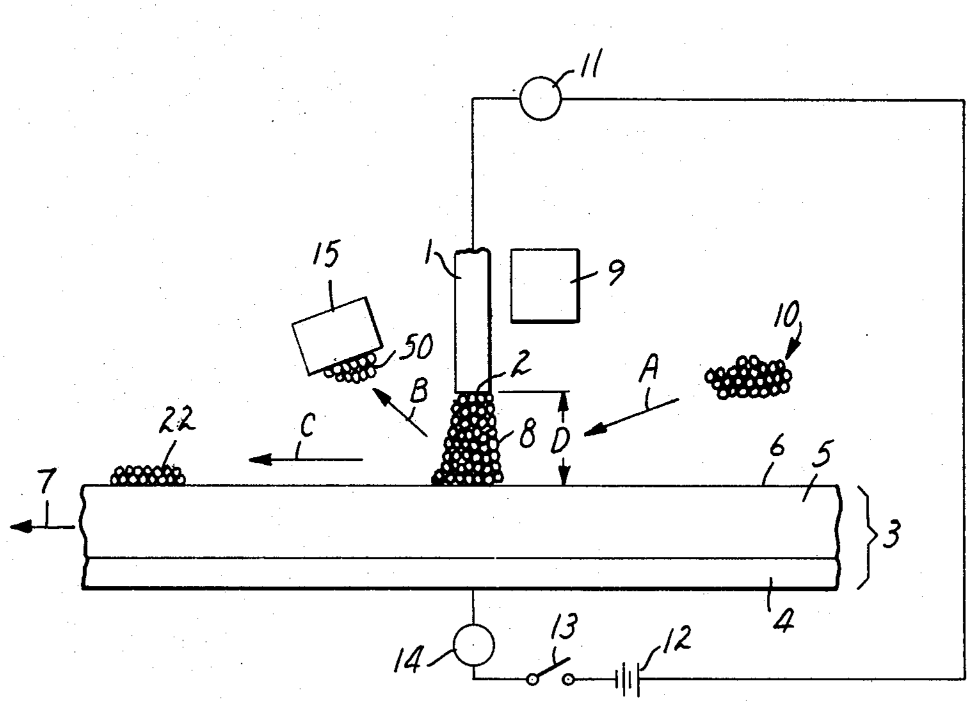
FIG. 1 is a diagrammatic showing of apparatus embodying the invention.

Reference is made to FIG. 1 showing apparatus in schematic form which embodies the invention and which, when operated, performs the method of the invention. The basic apparatus embodying the invention includes a stylus recording electrode 1 having a portion, such as tip 2, spaced a short distance from a recording structure 3. The recording structure 3 includes a relatively electrically conductive electrode 4 and receptor recording member 5 in electronic contact with electrode 4. The term "electronic contact" as used herein is defined as contact between two materials wherein the charge transport across the interface between the two materials is determined principally by the electronic properties of the two materials and not by other intervening or surrounding materials. The receptor 5 provides a recording or receptor surface 6 spaced a relatively short distance from the tip 2 of the recording electrode 1 to establish a recording region. The shortest distance from tip 2 to surface 6 is represented by the distance D in FIG. 1 and is called the recording gap. It is the function of the electrode 4 to make electronic contact with the side of the receptor 5 that faces away from the tip 2 at least at a point or area generally in line with the tip 2. This permits the receptor recording member 5 to be provided by a sheet material with relative movement provided between the sheet material and electrode 4 or alternatively, the receptor member 5 can be provided by a layer of material that is adheredly bound to electrode 4 to provide the desired electronic contact. Relative movement is provided between the recording electrode 1 and the receptor recording member 5. Such movement is depicted by the arrow 7 representing movement of the receptor recording member to the left as viewed in FIG. 1. A temporally relatively constant force is provided in the region between tip 2 of electrode 1 and the recording surface 6 by a force producing means 9 which acts on electronically conductive toner 8 supplied to the recording region by a toner supply means diagrammatically shown by the toner represented at 10 to establish an electronically conductive path between electrode 1 and the receptor recording member 5 via the toner. If the particles of toner 8 are magnetically attractable, the force producing means 9 can be a stationary magnetic source which will provide a force in the form of a temporally relative constant magnetic field. The stationary magnetic source 9, for example, can be an electro-magnet or permanent magnet. Due to the action of this magnetic field, particles of magnetically attractable, electronically conductive toner 8, brought to the recording region during operation of the apparatus, form chain-like aggregates of toner which extend between the tip 2 of electrode 1 and the recording surface 6 to establish an electronically conductive path between electrode 1 and surface 6. While the magnetic source 9 is shown to the right of the electrode 1, it is only necessary that it be positioned to provide a high magnetic force at tip 2. It is preferred that the available magnetic field be concentrated at or near the tip 2 by the electrode 1. To this end the electrode 1 may preferably be of magnetically permeable material when a magnetic source 9 separate from the electrode 1 is used. It is also possible to use an electrode 1 that is permanently magnetized to provide such magnetic force. The toner supply means 10 provides a regular or uniform supply of toner to the recording region. The flow of toner to the recording region is depicted by the arrow A. The manner in which a regular or uniform supply of toner is delivered is not a critical aspect of the invention and a number of well known means for carrying out this function will be discussed in connection with various embodiments to be described.

Since chain-like aggregation of toner 8 which extends between the tip 2 of electrode 1 to the surface 6 of the recording structure 3 establishes a plurality of electronically conductive paths between the tip 2 and the surface 6, the application of an electrical potential between the electrode 1 and electrode 4 to establish unidirectional electronic current flow via the toner causes an electric charge to accumulate on the toner particles adjacent the surface 6 creating a force of attraction between such toner particles and the surface 6 that can be in excess of the magnetic force acting on such toner particles to cause such charged toner to remain associated with a portion of the receptor 5 as recorded or image toner. Such an electrical potential sufficient to cause toner to be deposited as image toner will hereinafter be referred to as a recording electrical potential. The toner carried away from the recording gap as image toner is indicated at 22 with the arrow C depicting the flow of such image toner from the recording gap. A more detailed discussion of the manner in which the toner is deposited is set forth in U.S. Pat. No. 3,816,840 to A. R. Kotz.

The manner in which a recording electrical potential is applied is shown schematically in FIG. 1 wherein electrode 1 is connected via an impedance 11 to one side of an electrical potential source represented by a battery 12 which has its other side connected to the electrode 4 via a switch means, shown by switch 13, connected in series with an impedance 14. The impedance 11 and 14 are included merely to illustrate the general form for the circuit and while they may be present, they are not required circuit elements. Completion of the circuit by operation of the switch 13 is effective to cause unidirectional current flow via the toner presented at the recording gap. The use of batteries, switches and the like is only generic for purposes of explanation. It is to be understood that a wide variety of electrical apparatus can be employed to supply the electrical potentials for this invention.

While only a single electrode 1 is shown, numerous electrodes, each electrically insulated from one another, can be used to form a stylus array with a separate switch means provided for each electrode to apply a recording electrical potential when desired.

Except for the magnetic field concentrated at the tip 2, the apparatus described to this point does not provide for any positive control of the toner brought to the recording region. The arrangement described up to this point in connection with FIG. 1 is in accordance with the teachings of U.S. Pat. No. 3,816,840 to Kotz and, particularly, the embodiment shown in FIG. 15 of that patent. Such an arrangement will provide for the deposition of toner images at the recording surface 6 in accordance with recording electrical potentials applied between the electrode 1 and the recording electrode 4 when toner is supplied to the recording region. It was discovered that the consistency or repeatability of the recorded image for a given recording electrical potential is greatly enhanced when a temporally relatively constant force is provided which acts on the toner aggregates 8 in the recording region to remove toner from the recording region serving to maintain a constant quantity of toner in the recording region with the removal being accomplished in such a manner that the removed toner is not in electronic contact with the toner in the recording region.

The importance of this toner removal force can be appreciated if the imaging operation is considered without such a force. Since toner image formation generally involves the presentation to electrodes 1 and 4 of recording electrical potential at various times, the amount of toner, indicated by arrow C, flowing out of the recording region on receptor surface 6 as recorded image toner 22 varies correspondingly. Since the rate of flow of toner indicated by arrow A into the recording region will not coincide with the rate the toner is consumed in the generation of recorded image toner 22 (i.e., $A \neq C$), the quantity of toner in the chain-like aggregates 8 in electronic contact with electrode 1 and bridging the space between said electrode 1 and receptor surface 6 will not remain constant during the operation of the recording process. This variation in the amount of the toner aggregates 8 causes variations in the electronic contact area of toner aggregates to electrode 1 and in the size of the area of contact between the receptor surface 6 and the toner aggregates 8 as well as variations in the electronic paths provided by the toner. Furthermore, in embodiments employing a plurality of stylus electrodes 1, the electrical conduction path formed between adjacent styli through the toner aggregates 8 in the recording gap likewise vary with the quantity of toner in bridging aggregates of toner. The quantity and spatial position of toner particles deposited onto receptor surface 6 in response to a given recording electrical potential and consequently the consistency or repeatability of the recorded image for the given recording electrical potential varies with imbalances in the toner flows depicted by arrows A and C. For these reasons, inter alia, it is seen that the generation of recorded images that can be repeated for given electrical recording potentials to provide high quality imaging can be obtained if a constant quantity of toner is maintained in the recording region to provide electronic contact between electrode 1 and the surface 6 of the recording member 5 during the dynamic operation of the recording process, i.e., an equilibrium condition of toner quantity in the recording region is established.

The toner removal force that has been described serves to maintain a constant quantity of toner in the recording region by removal of toner from the recording region that accumulates in excess of such constant quantity due to changes in the flow A into the recording region and changes in the flow C out of the recording region in the form of toner images. The movement of toner due to the toner removal force is depicted by the arrow B in FIG. 1 with the source of the toner removal force indicated at 15 and the removed toner indicated at 50. The toner removal means 15 can be positioned on either or both sides of electrode 1.

The supply of toner into the recording region, the interaction of the magnetic force at the tip 2 of electrode 1, the deposition of toner in response to recording electrical potentials and the toner removal force on toner aggregates 8 at the recording region gives rise to a steady state balance in toner flow, which can be represented by the symbolic expression $A=B+C$, thereby maintaining a constant and sufficient quantity of chain-like aggregates 8 in electronic contact with electrode 1 independent of flow C. This steady state condition is reached almost instantaneously upon introduction of toner by flow A into the recording region and is maintained during the recording process provided that the rate of formation of recorded image and its subsequent removal from the recording region as toner flow C is less than or equal to the toner flow A into the recording region, i.e. C≦A. The difference in toner flows A and C is the fluctuation of accumulated toner at the recording region in excess of the constant quantity to be maintained at the recording region and is removed from the recording region and from electronic contact with the toner at the recording region as represented by toner flow B due to the toner removal force, i.e. B=A−C. In this way positive control of the toner brought into the recording region is maintained at all times during the dynamic operation of the recording process. It is only necessary that care be taken to assure that a sufficient quantity of toner, indicated by flow A, reaches the electrode 1 to allow continuous deposition of toner should a recording electrical potential be applied 100 percent of the time.

The toner removal force can be a magnetic field, if magnetically attractable toner is used, which can be provided by the stationary magnetic source 9 or a separate magnetic source, as represented by the toner removal means 15, or a combination of magnetic sources. Rather than using a magnetic source to provide the toner removal force, a vacuum source can be used which connects with a conduit positioned near the recording region. It has been found, and surprisingly so, that the force for toner removal that is provided to assist in the maintenance of a steady state sufficient quantity of toner in the recording region can vary over a wide range without appreciably altering the quality of the toner image produced in the recording region in response to applied recording electrical potential signals. It is believed that such wide variation in the toner removal force that may be used, is made possible by the high degree of concentration of the magnetic field that is provided at the tip 2 of the electrode 1 which assures the presence of a sufficient quantity of toner in the recording region for proper deposition of tone onto the surface 6 with the toner removal force being effective only to remove excess accumulated toner from electronic contact with the toner in the recording region.

In situations where the magnetic source 9 is also used to provide the desired toner removal force, the magnetic field that is not presented at the recording region via the electrode 1 serves to draw the excess toner toward the magnetic source 9. The magnetic field that is present at the edges and corners of the configuration may be used to provide the magnetic field for removal of the excess toner toward the magnetic source 9 and out of electronic contact with the toner in the recording region. Typical configurations and positions for the magnetic source 9 and the toner removal means 15 will be illustrated in the various embodiments of the invention which will be described.

It should be appreciated that a suitable toner removal means 15 may provide a toner removal force that is a non-magnetic force such as, but not limited to, the flow of air presented by a source of vacuum positioned adjacent to the electrode 1 and the recording region. Further, the toner removal means 15 may be provided by more than one removal force acting in combination.

Before discussing various embodiments of the invention details regarding properties of suitable materials and structures for the receptor recording member 5, toner and stylus electrodes 1 useable in practicing this invention will be considered.

The electronic properties of the receptor 5 affect the operation of the present invention with the limits placed on these properties dependent on the specific embodiment. The product of the resistivity and permittivity (i.e., the dielectric relaxation time) of the receptor 5 should be sufficiently high to prevent charge from flowing from the charged toner deposited on the receptor 5 that would reduce the electrical force between the toner and the receptor 5 below that needed to overcome the magnetic force acting on the toner while in the recording region. The dielectric relaxation time of a particular receptor 5 depends on the recording rate and in general should be at least $10^{-6}$ seconds. The receptor 5 should be sufficiently thick to withstand the electrical potential applied during the process. A thickness of at least $10^{-6}$ centimeters is generally acceptable. The maximum thickness of the recording member 5 is limited by the maximum voltage employed in the recording process and the maximum resolution desired in the toner image pattern. Generally, thicker materials can require higher voltages and/or lower resistivities. Alternatively, the required effective dielectric relaxation time can be obtained from the electronic contact barrier at the interface between a charged toner particle and the surface 6 of receptor 5. In this case, the exchange of charge between toner particles and the receptor 5 is controlled in whole or in part by this contact barrier thereby allowing the use of receptor 5 which has electronic properties similar to those which will be described for the recording electrode 1.

The receptor recording member 5 of this invention may be composed of a wide variety of materials including dielectric coated paper, polymeric sheets, especially polyester sheets, glass, organic epoxy coatings, dielectric coatings such as aluminum oxide, tantalum oxide, silicon dioxide, silicon nitride, zinc oxide, and the like. Also, the receptor 5 may be composed of a photoconductive material either alone or disposed in an insulating binder, for example, arsenic selenide, titanium dioxide, selenium, cadmium sulfide, and organic photoconductors such as poly-N-vinylcarbazole, alone, sensitized, or in combination with trinitrofluoroenone. However, it is to be understood that the process of this invention does not require that the receptor 5 bear any pattern of intelligence, latent or otherwise, and in that sense the receptor 5 is regarded for purposes of this invention as electrically passive. Typical patterns of intelligence which could occur on a receptor 5 are an electrostatic charge pattern such as disclosed in Middleton, U.S. Pat. No. 3,121,006, and a conductivity pattern as disclosed in Shely, U.S. Pat. No. 3,563,734. While these and other patterns may be present when the process of the invention is used, they do not constitute the pattern of intelligence produced by means of this invention.

The electronically conductive toner used in the apparatus and process of this invention must be sufficiently conductive to allow current to flow via the toner present at the recording gap so a substantial electric charge and, hence, electrical potential on the toner adjacent to the receptor 5 may thereby be built up when a recording electrical potential is applied to the electrode 1 so enough electric force is present on such toner to overcome, preferably by a factor of two or greater, any force opposing the deposition of toner on the receptor 5. This current flow depends not only on the resistance of the toner, but also on any other impedances that may be present in the circuit, so the upper limit of resistivity of the toner will depend on the particular embodiment of the present invention. Of course, the resistance of the toner path as a whole is the determining factor and, therefore, the thickness, length and packing properties of the toner path must also be considered. The toner must have sufficient resistivity that, in conjunction with the resistivity of the receptor 5, the necessary force-producing charge on the toner particles contacting the surface 6 of the receptor member 5 does not flow into the receptor member 5 during the time the electric force for deposition of the toner is being formed. Since the resistance of the receptor 5 is generally large compared to the resistance of the current path provided by the toner, the receptor 5 is the limiting factor in this charge exchange and the toner can have quite a low resistivity when used with a receptor 5 having a relatively high resistivity.

Suitable conductive, magnetically attractable toners are commercially available and a preferred toner is of the type described in U.S. Pat. No. 3,639,245 to Nelson. Such toners are heat fusible, generally spherical in shape, have a relatively insulating core and relatively electronically conductive peripheral surface and are magnetically attractable. The electronic resistivity of the toner should be less than about $10^{10}$ ohm cm, and preferably less than $10^8$ ohm cm when measured in an electric field of 100 volts/cm. The major dimension of the toner particles may suitably range from submicrometer to about 300 micrometers, preferably from about 5 to about 30 micrometers. Spherical shaped particles are preferred. Toners with similar properties which are pressure fixable type, such as those as described in U.S. Pat. Nos. 3,925,219 and 3,965,022, are also suitable for use in the practice of this invention. These toners are only examples of many suitable toners.

The stylus recording electrode 1 and recording electrode 4 employed in the practice of this invention are each composed of at least one portion which is electronically conductive. The electronically conductive portions of the electrodes should have a time constant (resistivity times permitivity) substantially less than the time constant determined by the receptor recording member 5 and the chain-like aggregation of toner in recording region. A suitable time constant for such conductive portions depends on the particular embodiment of this invention and is generally less than $10^{-3}$ seconds, and preferably less than $10^{-6}$ seconds. The resistivity of these conductive portions should be less than about $10^{10}$ ohm cm., and preferably less than about $10^7$ ohm cm.

The stylus recording electrode 1 may be provided in a variety of shapes and styles, and in most embodiments, a linear array of electrodes is employed to form a styli head in which each stylus electrode is individually connected directly or through an impedance to a switch controlled recording electrical potential as schematically indicated in FIG. 1. The stylus electrodes are generally disposed in the direction perpendicular to the relative direction of motion between stylus electrode 1 and receptor recording member 5. The number of stylus electrodes per unit length in such direction determines, at least in part, the resolution of the toner image in such direction. For most embodiments of this invention, this image resolution may be described in terms of the number of stylus electrodes per centimeter or alternatively in terms of line pairs per millimeter, where the latter is typically equivalent to one-half the number of stylus electrodes per millimeter. The number of stylus electrodes per unit length will vary with the stylus electrode structure and depend on the resolution desired. The number per unit length may also vary along the length of the styli electrode array. Stylus arrays varying from a single stylus electrode to 200 styli/centimeter have been used. The tips of the styli electrodes presented at the recording region may be the same or different in design or geometric shape depending, at least in part, upon the pattern to be developed.

A variety of materials and constructions can be utilized in the fabrication of styli electrode arrays including iron wire, nickel wire, etched lines in thin film metals, electroformed nickel lines, electroplated etched circuits, laminates of metal and insulator and others. When magnetic forces are used, using magnetically permeable materials for the electrode 1 will provide better passage for the magnetic lines from the magnetic producing member 9 to the recording region between the tip of the electrodes 1 and the surface 6 of the receptor member 5. When the stylus electrode 1 is fabricated from non-magnetically permeable materials, the electrode may be mounted in close proximity to a physically separate permeable material such that the aforementioned magnetic field at the recording region is provided. By using care in selecting the form and position for magnetic source 9, the needed magnetic field at the recording region can be provided without the assistance of a separate permeable material.

When a styli electrode array is used, the array is typically bonded to a rigid substrate forming a recording head to provide ease of handling and to provide durability of the recording head. The particular shape of this recording head is not critical.

Figure 2:
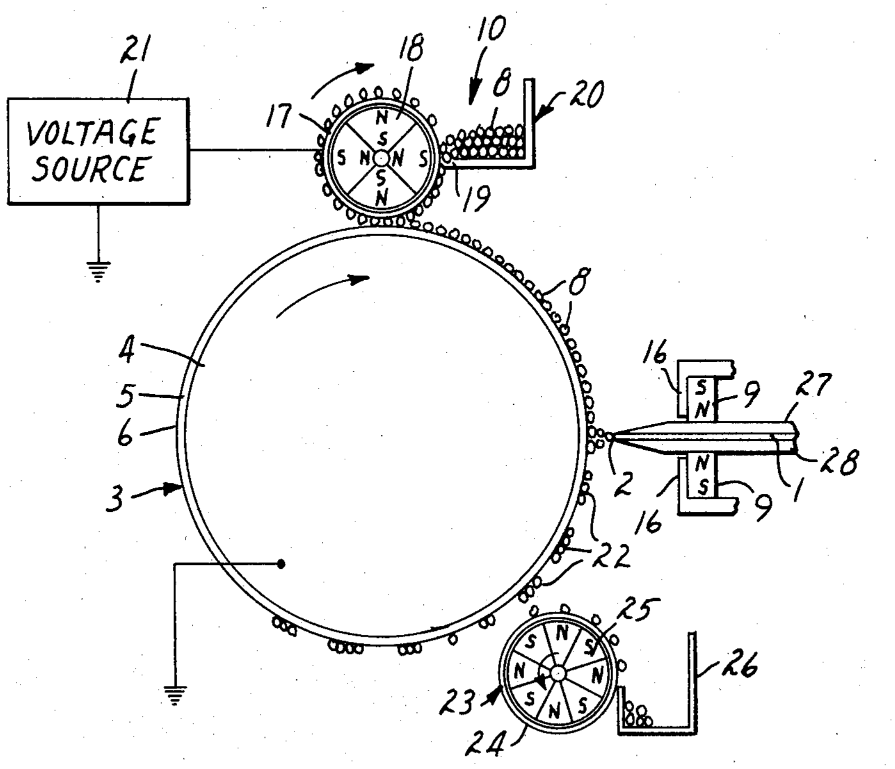
FIG. 2 is a more detailed diagrammatic showing of apparatus embodying the invention.

An embodiment of the electrographic recording process and apparatus of this invention is shown in FIG. 2 wherein the recording structure 3 includes a receptor recording member 5 supplied by coating of a dielectric material on the outer surface of an electronically conductive drum 4 that is arranged to rotate clockwise about its axis as indicated in FIG. 2 by a drive means, such as an electric motor (not shown). The apparatus of FIG. 2 is useable with magnetically attractable, electronically conductive toner.

Figure 3:
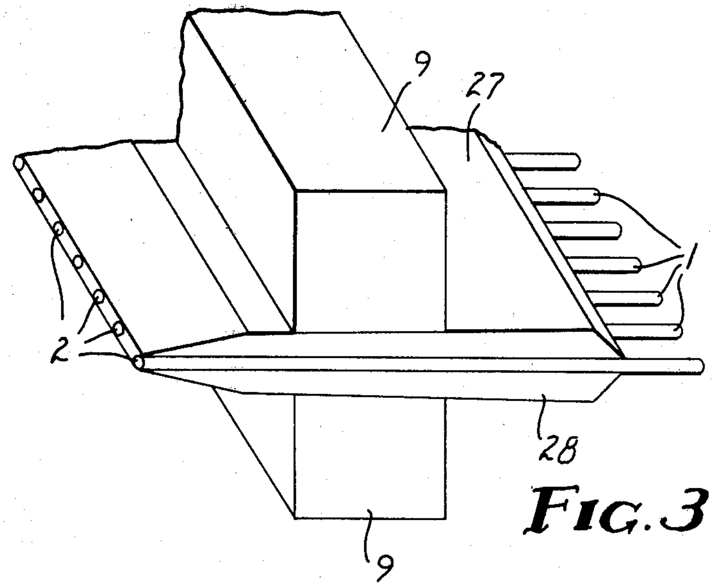
FIG. 3 is a partial perspective view of a stylus array of structure useable with the apparatus of FIG. 2.

The stylus electrode 1 of FIG. 2 is one of an array of spaced apart, parallel electrodes shown in greater detail in FIG. 3 wherein the electrodes 1 are cast in an epoxy and bonded between two members 27, 28 of an electrically insulating material. The electrodes 1 are of magnetically permeable material. The stylus array is positioned generally perpendicular to and a relatively short distance away from the recording surface 6 of FIG. 2 with the tips 2 of the stylus electrodes parallel to the recording surface 6. The recording gap, i.e., the shortest distance between the stylus electrode tips 2 and recording surface 6 should, as a minimum, be at least equal to the diameter of the largest toner particle of the toner to be used. As a practical matter, the gap preferably should be large enough so a plurality of toner particles forming at least one elongated toner chain-like aggregate can be accommodated in the gap thereby insuring a suitable electronically conductive path between the tips 2 and the surface 6. A suitable distance range for the gap distance is from 5–5000 μm and preferably from 50–700 μm. In general, the closer the spacing between adjacent stylus electrodes is made to accomplish higher recorded image resolution, the smaller the toner particles and the smaller the recording gap should be for a particular situation.

A stationary magnetic source 9 in the form of two electro-magnets or permanent magnets rigidly positioned adjacent to and on opposite sides of the recording head provides the desired high magnetic force at the exposed tip 2 of each of the stylus electrodes. In this embodiment, the electro-magnets or permanent magnets for the magnetic source 9 also provide the toner removal force in the form of a lower magnetic force adjacent to the recording region acting to remove excess accumulated toner from and out of electronic contact with toner in the recording region thereby maintaining the necessary steady state quantity of toner at the recording region as additional toner is brought to the recording region in a regular or uniform manner. The excess toner collected by the magnetic source 9 can be removed by a vacuum pull-off system provided at the source 9. Two conduits 16, as shown in FIG. 2 which connect with a vacuum source (not shown), may be positioned with an opening adjacent to, but spaced a short distance from the two magnets providing the magnetic source 9 to remove the excess toner as it is collected. The removed toner can be collected for later use or can be sent back directly to the toner hopper 20. Thus, in this preferred embodiment, the magnetic source 9 also serves to provide the function of the toner removal means 15.

As indicated, magnetically permeable materials can be used for the electrode 1. By permanently magnetizing the material used for electrode 1, the separate magnetic producing member 9 need not be used. In this case, the vacuum present at the conduits 16, as well as the position of the openings for conduits 16, can be adjusted to serve as the toner removal means.

The toner supply means 10 for providing a uniform or regular layer of dry, magnetically attractable, and electronically conductive toner 8 to the recording surface 6 includes a magnetic roll type of toner applicator having an electronically conductive shell 17 with one or more stationary magnets 18 inside. The shell 17 is rotated clockwise at sufficient speed to supply toner, while toner 8 is metered onto the shell by a doctor blade 19 from a toner supply hopper indicated generally at 20. The shell 17 is electrically connected to a d.c. voltage source 21 of a magnitude sufficient to cause the toner to be electrically charged and adhere to the recording surface 6, which then carries the toner into the recording region at the tips 2 of the stylus electrodes 1 by the clockwise rotation of the drum 4. The charge on the toner decreases by controlled charge leakage into the receptor 5 during the time the toner moves to the recording region at electrode 1. At the recording region substantially all of the toner is moved from the recording surface 6 by the magnetic force present at the recording region to form chain-like aggregates of toner which bridge the recording gap. As described in connection with FIG. 1, the stylus electrodes 1 are selectively connected individually to sources of recording electrical potentials capable of providing voltage pulses of suitable amplitude and duration in accordance with a desired toner image. As described in connection with the apparatus of FIG. 1, toner is deposited onto the receptor recording surface 6 in an imagewise manner opposite the tips of those stylus electrodes to which a recording electrical potential with respect to the receptor electrode 4 is applied. Such recorded image toner is bound to the receptor 5 by electrical forces which exceed the aforementioned magnetic forces at the recording region. In this sense, this toner is again associated with the receptor 5 and moves out of the recording region as indicated by the toner at 22 by the further rotation of the recording drum. When a stylus electrode is not supplied with a recording electrical potential, no toner is deposited in the areas of the recording surface opposite such electrode, i.e., the toner remains magnetically attracted toward such stylus electrodes. Toner chains at non-recording styli do not require replenishment and the incoming supply of toner creates an excess of toner which is pulled out of the recording region and out of electronic contact with the toner at the gap by a toner removal force, which in FIG. 2 is provided by the magnetic force of attraction supplied by the magnetic source 9. In this way, a recorded toner image is formed in response to any recording electrical potential and excess accumulated toner, i.e., toner not used to form the recorded image or to replenish toner chains, is pulled out of the recording region so that a constant supply of toner is presented at the recording region. This excess removed toner, if desired, can then be recycled back to the hopper 20 for the applicator roll for reuse. The excess removed toner can, for example, be drawn away from the magnetic source 9 by the use of the vacuum pull-off system indicated in part by the two vacuum conduits 16.

One aspect of the present invention which was not discussed in connection with FIG. 1 is the use of an optional second toner remover means. Referring to FIG. 2, the recorded image toner deposited onto the recording surface 6 at the recording region is held to the recording surface by the aforementioned electrical forces and this image toner indicated at 22 moves with the recording surface 6 out of the recording region. A relatively very small amount of non-image or background toner may remain on the recording surface 6 after passing through the recording region. Such non-image toner is not charged during the recording process and consequently is held to the recording surface 6 by a much weaker force than the recorded image toner 22. A second toner removal means 23 positioned adjacent the recording surface 6 downstream of the recording region provides a force for removing such non-image or background toner is shown in FIG. 2. It includes a stationary shell 24 positioned adjacent to the recording surface 6 with one or more sections of magnets 25 positioned for rotation within the shell 24 for providing a magnetic field on the outside of the stationary shell, a suitable drive means (not shown) for rotating the magnets 25 and a hopper 26 having an edge portion positioned close to the surface of the shell. The loosely held non-image or background toner is pulled off the recording surface 6 by the magnetic field and is carried away on the shell from the region between the stationary shell and recording surface to the hopper 26 by the action of the rotating magnet sections 25. The toner is removed from the shell by the edge of the hopper 26 adjacent the shell and collected in the hopper. With the hopper 26 positioned as shown in FIG. 2, the magnets are rotated counterclockwise to cause the toner, due to the magnetic action, to move clockwise around the shell 24.

The image toner 22 after passing the optional second toner removal means 23, if used, may be bonded to the receptor 5 directly or transferred to a secondary substrate for bonding thereto or for further transfer if desired. Alternatively, the image toner 22 may provide a temporary display either on the receptor or another substrate, such display being viewed or recorded by other means such as cameras, magnetic means, photocells, the human eye, or by any other means for sensing the presence or absence of toner. If desired, the receptor 5 can be reused. In such cases the toner image 22 can be removed from the receptor 5 with a brush or by magnetic means exerting a force greater than the force holding the image toner 22 on the receptor. In cases where the receptor 5 is integrally bonded to an electrode, erasure or toner removal can be accomplished by the means which provided the counterforce to the initial deposition of the toner on the receptor 5, provided the toner retaining force has dissipated below the force exerted by such means as, for example, through charge leakage into the receptor 5 or through other means.

Permanent bonding of the toner image to a substrate can be accomplished by well known conventional fixing techniques such as pressure, heat, or combinations thereof, or by use of chemical bonding agents or by bonding a sheet or film over the surface bearing the toner image. Any selected fixing procedure may depend upon the specific toner properties.

Because of this unique process in which a steady state constant quantity of toner is maintained in the recording region and in electronic contact with the recording stylus electrodes and the surface 6 of the receptor member 5 and because the individual stylus electrodes may be addressed at any desired rate for any desired duration, the recording process of this invention has the capability of attaining very high speeds on the order of 200 cm per second or greater. The process is also adaptable to recording at variable speeds and providing a high resolution image, e.g., the equivalent of 10 line pairs per mm or greater, at the aforementioned vary high recording speeds.

Figure 4:
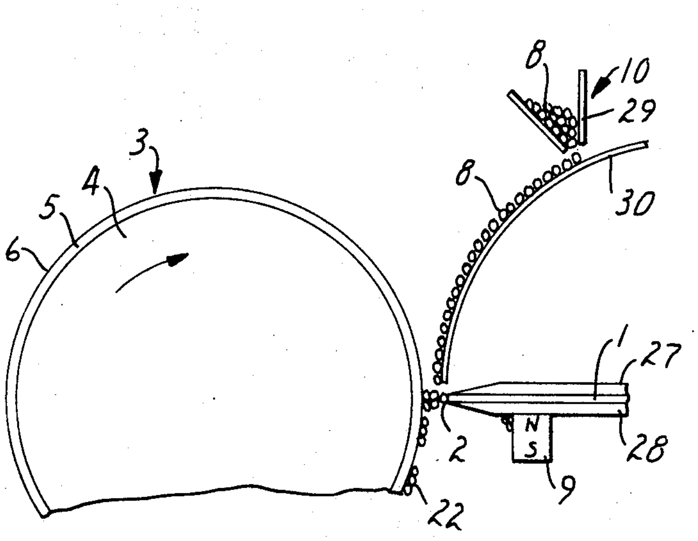
FIG. 4 is a diagrammatic showing of a modification applicable to the apparatus of FIG. 2.

FIG. 4 shows a modification of the apparatus of FIG. 2 wherein a different toner supply means 10 for providing a uniform or regular supply of toner 8 to the recording region is employed. In FIG. 4, the toner supply means 10 includes a hopper 29 for toner disposed above the recording region with a toner receiving member 30 positioned at an angle for receiving toner from the hopper 29 and allowing the toner 8 to cascade in a uniform manner along the surface of the member 30 to the recording region between the surface 6 of the receptor 5 and the tip 2 of the stylus recording electrode 1. In this case, a single magnet is used on the downstream side of the electrode 1 as the magnetic source 9 for providing the necessary magnetic field at the recording region plus the magnetic field for pulling excess accumulated toner from the region of the recording region and out of electronic contact with the toner at the recording region.

Figure 5:
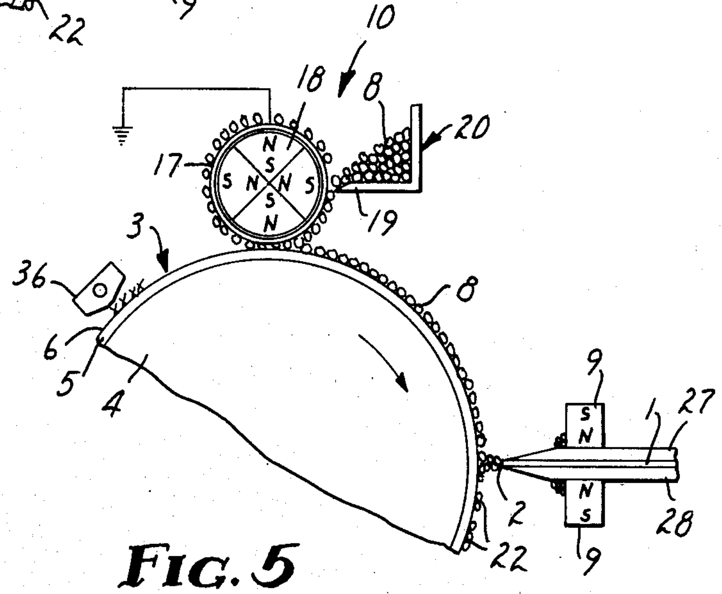
FIG. 5 is a diagrammatic showing of another modification applicable to the apparatus of FIG. 2.

FIG. 5 shows another modification of the apparatus of FIG. 2 wherein the toner supply means 10 for providing a uniform or regular supply of toner 8 to the recording region is different. As in FIG. 2, a magnetic roll type of toner applicator having a rotating electronically conductive shell 17 with one or more stationary magnets 18 within the shell plus the hopper 20 with the doctor blade 19 is utilized in the apparatus of FIG. 5. In this case, the shell 17 is connected to ground and upstream of the toner applicator a d.c. corona source 36 is positioned to place an electrical charge on the receptor 5. With the charge present on the receptor 5, toner 8 presented to the receptor 5 from the toner applicator as the receptor 5 is moved past the toner applicator is attracted to the receptor 5 by a charge induced on the toner to provide a uniform layer of toner on the receptor 5 to the stylus electrode 1.

Figure 6:
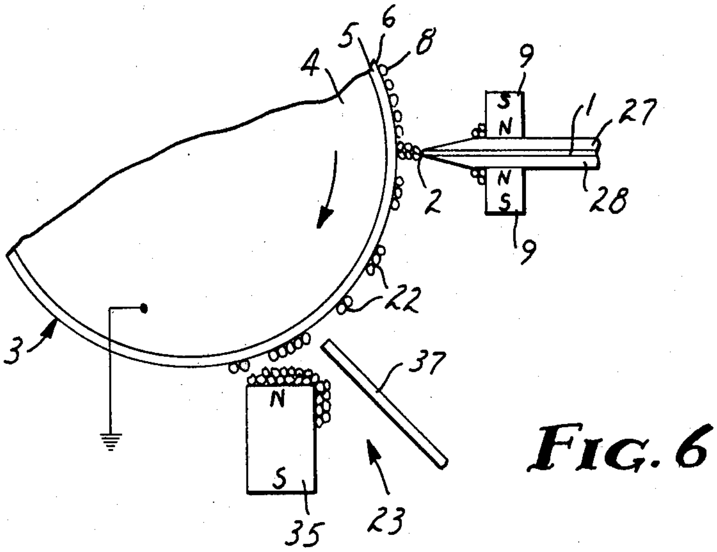
FIG. 6 is a diagrammatic showing of a further modification applicable to the apparatus of FIG. 2.

FIG. 6 shows a modification of the apparatus of FIG. 2 with respect to the optional second toner removal means 23. In FIG. 6, the second toner removal means 23 is provided by an air conduit 37 which is connected to an air supply (not shown) for directing a steady stream of air to the surface of the receptor 5 which is sufficient to dislodge the background or non-image toner particles from the receptor 5. A magnetic source 35 positioned a short distance from the receptor 5 serves to collect the dislodged background toner. The magnetic source 35 may be provided by a permanent magnet. The collected toner can be removed by a vacuum source (not shown) and can then be reused at the toner supply means 10.

Figure 7:
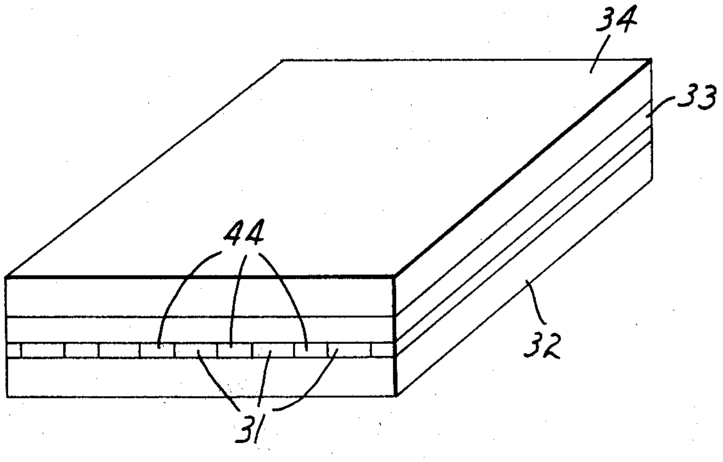
FIG. 7 is a perspective view of a stylus array structure useable with the apparatus of FIG. 2.

The stylus electrode 1 described in connection with the apparatus of FIG. 2 was indicated to be of magnetically permeable material. The electrode 1 can be made of non-permeable material with a permeable piece of material mounted in close proximity to the electrode 1, as taught in U.S. Pat. No. 3,879,737 to Lunde. A wire styli array recording head in accordance with such structure is shown in FIG. 7 and can be used in lieu of the styli array of the type shown in FIG. 3 where the electrodes are of magnetically permeable material. Referring to FIG. 7, the wire styli array includes a plurality of closely spaced non-permeable electrodes 31 formed by conventional photoetch techniques for selectively removing portions of copper foil laminated to a flexible insulative sheet 32. After the electrodes 31 are formed, another insulative sheet 33, to which a layer 34 of magnetically permeable material is bonded, is laminated to the copper electrodes 31 using an insulative adhesive material 44. The insulative adhesive material 44 fills the space between the electrodes 31. When using the styli array of FIG. 7 with the apparatus of FIG. 2, the sheet 34 of magnetically permeable material is positioned to face upstream toward the toner supply means 10.

Figure 8:
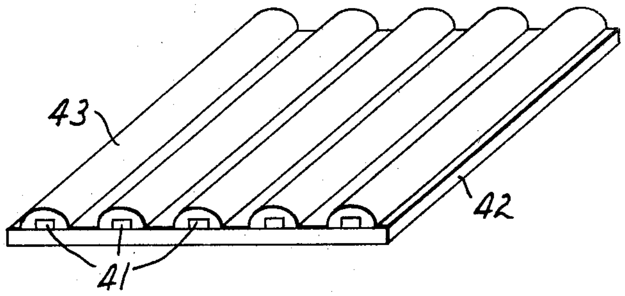
FIG. 8 is a perspective view of another stylus array structure useable with the apparatus of FIG. 2.

FIG. 8 shows another structure for a styli array in which each stylus is of non-permeable material. As in the case of the structure of FIG. 7, a plurality of closely spaced non-permeable electrodes 41 are formed by selectively removing portions of copper foil laminated to a flexible insulative sheet 42. Magnetically permeable material for each electrode is provided by plating a coating 43 of magnetically permeable material, for example, iron, onto the electrodes 41. The portion of the array to be used as a recording head can then, if desired, be cast in a suitable epoxy to provide the desired rigidity for the recording head.

In the following non-limiting examples the mentioned d.c. voltages, unless otherwise indicated, are measured with respect to ground and may be either positive or negative.

EXAMPLE 1

One example of the operating conditions and performance of this stationary magnet process using the apparatus of the type described in reference to FIG. 2 is as follows: The electronically conductive recording drum 4 is 25 cm in diameter and 25 cm wide. It is arranged, as viewed in FIG. 2, for clockwise rotation about its axis to provide surface speed of about 40 cm/second. The drum provides the conductive electrode 4. The receptor member 5 is provided by an approximately 2 μm thick coating or film of titanium epoxy silane of the composition described in U.S. Pat. No. 4,042,749 to Sandvig placed on the drum 4. A toner applicator station 10 of a type described in U.S. Pat. No. 3,455,276 to Anderson supplies toner to the receptor surface. The conductive shell 17 is connected to voltage source 21 providing a d.c. potential of about 15 volts and is rotated clockwise about its axis to provide a surface speed of about 10 cm/second. Four stationary magnet sections 18 fabricated from a barium ferrite powder magnetic material cast in a flexible polymer (available from 3M Company under the tradename Plastiform) provides a magnetic field of about 400 Gauss at the outer surface of the shell 17. The toner powder 8, of the type described in U.S. Pat. No. 3,639,245 to Nelson, having a static conductivity of about $3\times10^{-4}$ (ohm-cm)$^{-1}$ at an applied field of about 10 volts/cm, is metered onto the rotating shell 17 with the doctor blade 19 spaced about 0.1 cm from the shell 17. The shell 17 is spaced about 0.1 cm from the silane epoxy receptor 5. With the 15 volt potential applied to the shell 17, a relatively uniform layer of toner is deposited onto the recording surface. The recording styli electrode array 1 consists of a linear array of 3400 electronically conductive wire styli of about 30 μm diameter spaced on about 65 μm centers. The styli wires consist of a magnetically permeable alloy (49% Fe, 49% Co, 2% V) and the array is cast in an epoxy (such as No. 5 epoxy sold by the 3M Company, St. Paul, Minnesota under the trademark, Scotchcast) and then bonded to a hard, electrically insulating substrate such as a polycarbonate material (similar to that available from Generaly Electric Company under the tradename Lexan) to provide ease of handling and increased durability. The tips 2 of the styli electrodes are aligned parallel to and spaced about 150 μm from the receptor surface 6 with the wire axes approximately perpendicular to such surface. A magnetic field of approximately 1000 Gauss is provided at the styli tips 2 by a pair of permanent magnets 9 (sintered strontium ferrite available as Ceramic No. 8 from Permag Corp.) about 25 cm in length aligned parallel to and spaced about 1 cm from the recording surface 6. The styli electrode wires 1 are connected individually to a plurality of recording electrical potential signal sources (not shown) which maintain the styli electrode wires at about ground potential and are capable of providing a voltage pulse of about 30 volts amplitude with respect to the grounded drums and about 150 μsec duration when toner is to be deposited on the receptor. Either polarity potential can be used normally. The excess toner pulled off by the permanent magnets 9 is removed by the conduits 16 of a vacuum pull-off system and subsequently recycled to the hopper 20. The toner deposited onto the receptor surface 6 at the recording gap is held to the receptor 5 by electric charges as before and this image toner 22 moves with the recording suface 6 out of the recording gap. Spurious background or non-image toner present at the recording surface 6 is removed as the receptor surface 6 moves past the second toner removal member 23, as described in connection with FIG. 2. The stationary electronically conductive shell 24 is made from a 304 stainless steel tube and positioned approximately 0.3 cm from the recording surface 6. Eight sections of permanent magnets 25 located inside this shell are fabricated from sintered strontium ferrite magnet material available from Hitachi Corp. (No. YMB-2G) providing a magnetic field of about 500 Gauss on the outside surface of the stationary shell. This magnet assembly is rotated at a surface speed of about 200 cm/second.

The pattern of intelligence represented by the recorded image toner 22 remaining bound to the recording surface after moving past the second removal member was formed by selectively addressing individual stylus electrodes with voltage pulses from the electronic information source. This example provides a recorded image with about 165 dots/cm in the direction of motion of the drum and the styli spacing gives about 154 dots/cm parallel to the receptor drum axis. This provides a high quality printing of, for example, alphanumeric characters with an resolution of about 8 line pairs/mm. The image so formed is transferred by suitable means from the recording surface 6 to plain bond paper producing a hard copy document of the electronic information. In this manner high quality images can be obtained.

EXAMPLE 2

The apparatus of Example 1 was used, except the background toner remover means 23 was eliminated. The recording gap was decreased to about 75 μm and the magnetic field producing members 9 were moved to a position approximately 0.6 cm from the recording surface 6. In this example, the magnetic members 9 serve to provide the magnetic force producing field at the stylus electrode tips 2 and function to remove the excess accumulated toner from the recording gap as well as any background or non-image toner from the surface 6. The closer spacing of the styli electrode tips 2 and magnetic members 9 to the recording surface 6 is required to ensure removal of the non-image or background toner from the recording surface.

EXAMPLE 3

The apparatus of Example 1 is used, except the receptor 5 consisting of a titanium epoxy silane coating is replaced with a polyester sheet of the type manufactured by E. I. duPont under the tradename Mylar approximately 25 μm thick with one surface of the sheet metalized with aluminum. The polyester sheet is clamped onto the recording drum by suitable mechanical means with the aluminized side making electrical contact to the conductive recording drum 4. A d.c. potential of 60 volts, instead of 15 volts, is applied to the conductive shell 17 to apply toner to the receptor surface 6 and recording electrical potential pulses of 50 volts instead of 30 volts amplitude are applied to the stylus electrodes 1.

EXAMPLE 4

The apparatus of Example 1 is used, except the receptor 5 consisting of a titanium epoxy silane coating is replaced with a dielectric coated paper approximately 75 μm thick of the type sold by 3M Company, St. Paul, Minnesota under Part. No. 78-6544-0000-7. The paper is fastened to the recording drum by suitable mechanical means with the dielectric coated side of the paper serving as the receptor and positioned at the outside surface. The uncoated side of the paper is held by the mechanical fastening means in electronic contact with the recording drum 4.

EXAMPLE 5

The apparatus employed in Example 1 is used, except the permanent magnet members 9 are replaced by an electromagnet wound around the styli array forming a solenoid whose axis is parallel to the axes of the styli comprising electrode 1. The solenoid consists of 900 turns of a No. 16 magnet wire. A d.c. current of approximately 7 amperes is passed through the solenoid to generate a field of about 1000 Gauss at the styli tips 2. The surface of the solenoid coil adjacent the receptor 5 is positioned about 1 cm from the recording surface 6. Excess toner from the recording region is pulled to the inner edge of the solenoid coil.

EXAMPLE 6

The apparatus employed in Example 1 is used, except the wire stylus electrode array is replaced by a stylus array as shown in FIG. 8. The photo-etched array of copper styli 41 of approximate dimensions 10 μm thick by 20 μm wide spaced on 65 μm centers with the iron coating 43 plated to each copper stylus approximate 10 μm thick. This styli array is cast in an epoxy, as in Example 1, to provide a recording head.

EXAMPLE 7

The apparatus of Example 1 is used, except the toner supply means 10 of FIG. 2 is replaced by the cascading toner supply means shown in FIG. 4 with a single permanent magnet 9 used at the electrode 1.

EXAMPLE 8

The apparatus of Example 1 is used, except with the modification of the apparatus of FIG. 2 per FIG. 5 used. As in FIG. 5, the shell 17 of the toner supply means 10 is connected to zero potential and the d.c. corona source 36 is used to charge the titanium epoxy silane receptor to a potential of about 50 V. The corona source consists of an about 35 μm diameter gold plated tungsten wire and grounded shield of conventional design. The wire is held at a d.c. potential of about 5 kV and a total charging current of about 30 μamps is maintained. This corona source is positioned about 1 cm from the recording surface and 5 cm from the applicator roll.

EXAMPLE 9

The apparatus of Example 1 is used, except the second toner removal means of FIG. 2 is replaced by the second toner removal means 23 shown in FIG. 6. The conduit 37 directs air from a source (not shown) at the recording surface 6 at the rate of about 0.5 liter/sec. The magnetic source 35 is a permanent magnet positioned about 1 cm from the recording surface 6 and in the direction of air flow. A vacuum removal system is used to keep this magnet member clean and the toner collected is recycled to the applicator roll for reuse.

EXAMPLE 10

The apparatus of Example 1 is used, except the voltage source 21, instead of providing a d.c. potential on the conductive shell 17 of the roll, provides about 20 volt a.c. potential at approximate 200 Hz. Toner is deposited onto the receptor 5 from the shell 17 of the toner supply means 10 in alternating strips of positive and negatively charged toner. Charge leakage from the applied toner during the time of travel between the applicator roll and recording region occurs laterally on the surface of the recording member between alternately charged toner strips in addition to the aforementioned leakage through the receptor 5 to the conductive recording drum 4 in FIG. 2. Though the toner is not presented to the electrode tips 2 in a continuous manner, the toner is provided in a regular manner allowing the styli tips to have a sufficient quantity of toner to average the supply over the incoming stripe frequency of about 5 strips/cm.

EXAMPLE 11

The apparatus of Example 1 is used, except the wire styli array recording head is replaced by a non-permeable styli array of the type described in connection with FIG. 7. The non-permeable styli array is fabricated using flexible printed circuit material consisting of about 8 μm thick copper foil laminated to about 75 μm thick sheet of polyimide film sold by E. I. duPont under the trademark Kapton. The etched copper styli array consists of parallel electrodes 31 of copper about 150 μm wide and spaced approximately 150 μm apart. A 150 μm thick sheet 32 of such polyimide film is laminated over the copper electrode 31 and an 80 μm thick sheet of magnetically permeable iron 34 is placed on top of this layer giving the sandwich structure shown in FIG. 7. The permeable iron sheet with the pair of permanent magnets 9 provide the magnetic means of pulling the incoming toner particles from the recording surface and providing a supply of toner in electronic contact with the electronically addressed copper styli array.

EXAMPLE 12

The apparatus of Example 1 is used, except the wire styli recording head and magnetic source 9 of FIG. 2 are replaced by a wire styli recording head of the same structure wherein the styli wires are permeable and are permanently magnetized in a field of about 20 k Gauss and the magnets 9 are not used. The remanent magnetization of the wire styli is greater than 10 k Gauss to produce the required magnetic field at the styli tips. Excess toner not used in printing is pulled off by a vacuum duct, such as that used with the magnets 9 in FIG. 2, positioned along the styli head.

EXAMPLE 13

The apparatus of Example 1 is used, except the receptor 5 consisting of a titanium silane epoxy coating is replaced by an aluminum plate approximately 200 μm thick acid anodized on one surface to provide a suitable receptor 5. The aluminum plate is anodized in a 10 percent solution of ammonium tartrate at room temperature at a potential of about 150 volts for a time of approximately 40 seconds, giving an oxide of about 0.1 μm thick. The aluminum plate is clamped on the recording drum by suitable mechanical means and a toner image is recorded onto the oxide surface by the process described in Example 1. Upon completion of the imaging, the anodized aluminum plate is removed from the drum and heated to a sufficient temperature to fuse the toner image. The resultant plate is then used as a master on a conventional offset printing press.

Various modifications and substitutions will become apparent to those skilled in the art without departing from the scope and teachings of this invention.

What is claimed is:

1. Electrographic apparatus for use with dry, electronically conductive toner including:

first and second electrodes in spaced opposing relationship wherein said first electrode is stationary;

a receptor recording member spaced from said first electrode for providing a recording region between said first electrode and said receptor recording member, the receptor recording member adapted for making electronic contact with said second electrode, said receptor recording member adapted for movement relative to said first electrode;

means for supplying the toner to said recording region in a regular or relatively uniform rate for deposition on said receptor recording member as toner images;

force producing means for providing a temporally relatively constant force at said first electrode acting on the toner when supplied to said recording region to cause the toner to span the space between said first electrode and said receptor recording member to establish an electronically conductive path via the toner between said first electrode and said receptor recording member; and means adapted to apply recording electrical potential signals to said first electrode relative to said second electrode concurrent with the operation of said force means and movement of said receptor recording member relative to said first electrode for causing some of the toner of said recording region to be held on said receptor recording member as toner images, said force producing means also providing a temporally relatively constant force for removing a portion of the toner from said recording region and from electronic contact with the toner at said recording region for maintaining a constant quantity of toner in said recording region, the toner removed from said recording region by said force means being toner that accumulates in excess of said constant quantity due to changes in the amount of toner supplied to said recording region and the amount of toner held on said receptor recording member as toner images.

2. Electrographic apparatus in accordance with claim 1 wherein said force producing means for providing said second mentioned temporally relatively constant force includes a conduit having an opening presented adjacent said recording region, said conduit adapted for connection to a vacuum source.

3. Electrographic apparatus in accordance with claim 1 wherein the toner is magnetically attractable and said temporarily relatively constant forces are magnetic forces.

4. Electrographic apparatus in accordance with claim 1 wherein the toner is magnetically attractable and said first mentioned temporally relatively constant force is a magnetic force.

5. Electrographic apparatus in accordance with claims 3 or 4 wherein said first electrode includes magnetically permeable material.

6. Electrographic apparatus in accordance with claims 3 or 4 wherein said first electrode includes magnetically permeable material that is permanently magnetized for providing said first mentioned temporally relative constant force.

7. Electrographic apparatus in accordance with claim 1 wherein the toner is magnetically attractable and said force producing means for providing the temporally relatively constant forces includes at least one stationary magnetic source positioned adjacent said first electrode and spaced from said recording region.

8. Electrographic apparatus in accordance with claim 7 wherein said magnetic source has two magnetic poles, one of which is positioned adjacent said first electrode with the other of said magnetic poles spaced at a greater distance from said first electrode than said one magnetic pole.

9. Electrographic apparatus in accordance with claim 7 wherein a conduit, having an opening, is adapted for connection with a vacuum source with said opening presented between said magnetic source and said recording region.

10. Electrographic apparatus in accordance with claim 1 wherein the toner is magnetically attractable and said force producing means for providing temporally relatively constant forces includes a first stationary magnetic source positioned adjacent said first electrode and a second stationary magnetic source spaced at a greater distance from said first electrode than said first magnetic source.

11. Electrographic apparatus in accordance with claim 1 and further including a non-image toner removal means positioned at a point remote from said recording region and adjacent said receptor recording member for removing non-image toner from said receptor surface.

12. Electrographic apparatus in accordance with claim 11 wherein the toner is magnetically attractable and said non-image toner removal means provides a magnetic force for removing non-image toner from said receptor recording member.

13. Electrographic apparatus in accordance with claim 11 wherein the toner is magnetically attractable and said non-image toner removal means provides air flow directed for dislodging non-image toner on said receptor recording member and includes a magnetic field producing means positioned for removing toner dislodged from said receptor recording member by said air flow.

14. Electrographic apparatus for use with dry, magnetically attractable, electronically conductive toner including:

a receptor recording member;

first and second electrode means in spaced opposing relationship with said receptor recording member spaced from said first electrode, wherein said first electrode means is stationary, to provide a recording region between said receptor recording member and said first electrode and adapted for making electronic contact with said second electrode, said receptor recording member adapted for movement relative to said first electrode means, said first electrode means including means for providing a magnetic field at said recording region that is concentrated at said first electrode;

means for supplying the toner to said recording region in a regular and uniform manner whereby the toner when supplied to said recording region, is attracted toward said first electrode means by said magnetic field causing said toner to span the space between said first electrode means and said receptor recording member to establish an electronically conductive path via the toner between said first electrode and said receptor recording member;

means adapted to apply recording electrical potential signals to said first electrode relative to said second electrode concurrent with movement of said receptor recording member relative to said first electrode means for causing some of the toner at said recording region to be held on said receptor recording member as toner images;

force producing means for providing a temporally relative constant force acting on the toner when presented to said recording region to remove a portion of the toner from said recording region and from electronic contact with toner in said recording region for maintaining a constant quantity of toner in said recording region, the toner removed from said recording region by said force producing means being toner that accumulates in excess of said constant quantity due to changes in the amount of toner supplied to said recording region and the amount of toner held on said receptor recording member as toner images.

15. Electrographic apparatus in accordance with claim 14 wherein said force producing means includes a conduit adapted for connection with a vacuum source, said conduit having an opening for receiving said portion of the toner.

16. Electrographic apparatus in accordance with claim 14 wherein said force producing means includes a stationary magnetic source spaced from said recording region on said first electrode means side of said recording region.

17. Electrographic apparatus in accordance with claim 16 wherein said magnetic source is a permanent magnet.

18. Electrographic apparatus in accordance with claim 16 wherein said magnetic source is an electromagnet.

19. Electrographic apparatus in accordance with claim 14 and further includes a non-image toner removal means positioned at a point remote from said recording region and adjacent said receptor recording member for removing non-image toner from said receptor surface.

20. Electrographic apparatus in accordance with claim 19 wherein said non-image toner removal means provides a magnetic force for removing non-image toner from said receptor recording member.

21. Electrographic apparatus in accordance with claim 19 wherein said non-image toner removal means provides air flow directed for dislodging non-image toner on said receptor recording member and includes a magnetic field producing means for removing toner dislodged from said receptor recording member by said air flow.

22. An electrographic method for producing a toner image at the surface of a receptor recording member using dry, magnetically attractable, electronically conductive toner including the steps of arranging first and second electrodes in spaced opposed relationship, wherein said first electrode is stationary, with a receptor recording member interposed and spaced from said first electrode with electronic contact provided between said receptor recording member and said second electrode while providing movement of said receptor recording member relative to said first electrode as the toner is supplied in a regular or relatively uniform manner to the region between said first electrode and said receptor recording member while a temporally relative constant force is provided which acts on the toner to cause the toner to span the space between said first electrode and said receptor recording member causing the toner to provide an electronically conductive path between said first electrode and said second electrode;

applying recording electrode potential signals to said first electrode relative to said second electrode, while said movement of said receptor recording member relative to said first electrode is provided, causing toner to be held to said recording receptor member in accordance with signals to produce a toner image; and providing a temporally relatively constant force which acts on the toner in the region between said first electrode and said receptor recording member for removing a portion of the toner from said region and out of electronic contact with the toner in said region for maintaining a constant quantity of toner in said region, the toner removed from said region being toner that accumulates in excess of said constant quantity due to changes in the amount of toner supplied to said region and the amount of toner held on said receptor recording member as toner images.

23. An electrographic method in accordance with claim 22 including the further step of providing a non-image toner removal force at a point remote from said region for removing non-image toner from said receptor recording member.

* * * * *